United States Patent
Kong

(10) Patent No.: US 8,384,698 B2
(45) Date of Patent: Feb. 26, 2013

(54) DIRECT NAVIGATION OF TWO-DIMENSIONAL CONTROL USING A THREE-DIMENSIONAL POINTING DEVICE

(75) Inventor: Yuan Kong, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 214 days.

(21) Appl. No.: 12/952,021

(22) Filed: Nov. 22, 2010

(65) Prior Publication Data

US 2011/0063217 A1  Mar. 17, 2011

Related U.S. Application Data

(63) Continuation of application No. 10/914,118, filed on Aug. 10, 2004, now Pat. No. 7,859,523.

(51) Int. Cl.
*G06F 3/033* (2006.01)

(52) U.S. Cl. .................................. 345/179; 345/158

(58) Field of Classification Search .......... 345/156–159, 345/179; 715/863
See application file for complete search history.

(56) References Cited

U.S. PATENT DOCUMENTS

| | | | |
|---|---|---|---|
| 4,980,519 A | 12/1990 | Mathews | |
| 5,181,181 A * | 1/1993 | Glynn | 345/163 |
| 5,298,919 A | 3/1994 | Chang | |
| 5,313,230 A | 5/1994 | Venolia et al. | |
| 5,361,078 A * | 11/1994 | Caine | 345/1.3 |
| 5,703,623 A * | 12/1997 | Hall et al. | 345/158 |
| 5,963,197 A | 10/1999 | Bacon et al. | |
| 6,404,416 B1 * | 6/2002 | Kahn et al. | 345/158 |
| 6,704,000 B2 * | 3/2004 | Carpenter | 345/158 |
| 7,061,468 B2 * | 6/2006 | Tiphane et al. | 345/158 |
| 7,239,301 B2 * | 7/2007 | Liberty et al. | 345/158 |
| 7,746,321 B2 * | 6/2010 | Banning | 345/157 |
| 7,859,523 B2 | 12/2010 | Kong | |
| 2003/0006975 A1 | 1/2003 | Moriya et al. | |
| 2003/0076299 A1 * | 4/2003 | Trajkovic | 345/158 |
| 2004/0095317 A1 * | 5/2004 | Zhang et al. | 345/158 |
| 2005/0216867 A1 | 9/2005 | Marvit | |

OTHER PUBLICATIONS

Position Trackers: Magnetic. 2004. www.cs.utah.edu/classes/cs6360/Kolozs/magnetic/mag1.html.*
"3D Scanners", retrieved from <http://www.3dscanners.com/> on Aug. 10, 2004,1 page.
"3rdTech Home", retrieved from <http://www.3rdtech.com/> on Aug. 10, 2004,1 page.
"5th Glove", *General Reality Company Product Specifications*, retrieved from <http://www.genreality.com/glove_sheet.html> on Aug. 10, 2004,(1996),2 pages.
"Autonomous Calibration", retrieved from <http://www.cs.utah.edu/~jmh/Calibration.html> on Aug. 10, 2004,4 pages.

(Continued)

*Primary Examiner* — Chanh Nguyen
*Assistant Examiner* — Allison Walthall
(74) *Attorney, Agent, or Firm* — Wolfe-SBMC

(57) ABSTRACT

Direct and absolute pointing is provided for with respect to a two-dimensional information display surface, much like how one would point a laser pointer or flashlight at a desired point. The displayed control may be moved by manipulating the pointing device in three dimensions. The translational position of the pointing device may be measured in three dimensions. Also, the three-dimensional orientation of the pointing device may be measured. A computing device may receive this information from the pointing device and determine where the pointing device is pointing to. If the pointing device is pointing at a display, then the computing device may cause the control to be displayed at the position to which the pointing device is pointing. In addition, the control may be displayed at an orientation that depends upon the orientation of the pointing device.

22 Claims, 5 Drawing Sheets

OTHER PUBLICATIONS

"Axilglaze", retrieved from <http://www.axiglaze.com/> on Aug. 10, 2004,1 page.

"Cricket", retrieved from <http://www.didi.com/www/areas/products/cricket/> on Aug. 10, 2004,2 pages.

"CyberTrack II", *General Reality Company Product Sheet*, retrieved from <http://www.genreality.com/cybertrack2_sheet.html> on Aug. 10, 2004,2 pages.

"CyberTrack", *General Reality Company Product Specifications*, retrieved from <http://www.genreality.com/cybertrack_sheet.html> on Aug. 10, 2004,2 pages.

"Didjiglove—Animation at the Speed of Life", retrieved from <http://www.didjiglove.com/pages/index.html> on Aug. 10, 2004,1 page.

"Final Office Action", *U.S. Appl. No. 10/914,118*, (Oct. 22, 2009),18 pages.

"Final Office Action", *U.S. Appl. No. 10/914,118*, (Sep. 25, 2008),14 pages.

"GloveGRASP", *General Reality Company Product Specifications*, retrieved from <http://www.genreality.com/glovegrasp_sheet.html> on Aug. 10, 2004,2 pages.

"GloveMotion", *General Reality Company Product Specifications*, retrieved from <http://www.genreality.com/glovemotion_sheet.html> on Aug. 10, 2004,1 page.

"GMD Digital Media Lab Components: GAMS Tracker", retrieved from <http://viswiz.gmd.de/DML/hw/Trackers/gams.html> on Aug. 10, 2004,1 page.

"Grasping and Master Gloves", retrieved from <http://www.cs.utah.edu/~jmh/UMDH.html> on Aug. 10, 2004,2 pages.

"Gyration Media Center Remote Control", retrieved from <http://www.gyration.com/mcr.htm> on Mar. 16, 2004,1 page.

"ImageGlove", *General Reality Company Product Specifications*, retrieved from <http://www.genreality.com/imageglove_sheet.html> on Aug. 10, 2004,2 pages.

"ImageTrak", *General Reality Company Product Specifications*, retrieved from <http://www.genreality.com/imagetrak_sheet.html> on Aug. 10, 2004,2 pages.

"InterSense, Inc.—The New Standard in Motion Tracking", retrieved from <http://www.isense.com/> on Aug. 10, 2004,2 pages.

"Motion Analysis Press Release", retrieved from <http://www.motionanalysis.com/about_mac/press.html> on Aug. 10, 2004,9 pages.

"NDI: Home", retrieved from <http://www.ndigital.com/> on Aug. 10, 2004,1 page.

"Non Final Office Action", *U.S. Appl. No. 10/914,118*, (Dec. 31, 2007),13 pages.

"Non Final Office Action", *U.S. Appl. No. 10/914,118*, (Feb. 16, 2010),16 pages.

"Non Final Office Action", *U.S. Appl. No. 10/914,118*, (May 21, 2009),15 pages.

"Notice of Allowance", *U.S. Appl. No. 10/914,118*, (Aug. 11, 2010),5 pages.

"PHANTOM Devices", *SensAble Technologies*, retrieved from <http://www.sensable.com/products/phantom_ghost/phantom.asp> on Aug. 10, 2004,1 page.

"Polhemus Homepage", retrieved from <http://www.polhemus.com/> on Aug. 10, 2004,2 pages.

"UNC-CH Tracker Research Group Homepage", retrieved from <http://www.cs.unc.edu/~tracker/> on Aug. 10, 2004,5 pages.

"VirtuaHead: A Vision Based Head Tracker for Desktop VR", retrieved from <http://www.csl.sony.co.jp/person/rekimoto/vhead.html> on Aug. 10, 2004,1 page.

"Virtual Reality Resource Guide", *Interactive Innovations Technologies*, retrieved from <http://www.iitvr.com/trackers.html> on Aug. 10, 2004,(Apr. 5, 2000),2 pages.

Dowling, Kevin "What Robotics Related Products are There?", retrieved from <http://www.frc.ri.cmu.edu/robotics-faq/10.html> on Aug. 10, 2004,(Jul. 3, 1997),55 pages.

Kolozs, James "Acoustic Position Trackers", retrieved from <http://www.cs.utah.edu/classes/cs6360/Kolozs/acoustic/acol.html> on Feb. 13, 2004,2 pages.

Kolozs, James "Inertial Position Trackers", retrieved from <http://www.cs.utah.edu/classes/cs6360/Kolozs/inertial/ine1.html> on Feb. 13, 2004,2 pages.

Kolozs, James "Magnetic Position Trackers", retrieved from <http://www.cs.utah.edu/classes/cs6360/Kolozs/magnetic/mag1.html> Feb. 13, 2004,2 pages.

Kolozs, James "Mechanical Position Trackers", retrieved from <http://www.cs.utah.edu/classes/cs6360/Kolozs/mechanical/mec1.html> on Feb. 13, 2004,3 pages.

Kolozs, James "Optical Position Trackers", retrieved from <http://www.cs.utah.edu/classes/cs6360/Kolozs/optical/opt1.html> on Feb. 13, 2004,4 pages.

Kolozs, James "Position Trackers for Virtual Reality", retrieved from <http://www.cs.utah.edu/classes/cs6360/Kolozs/trackers.html> on Feb. 13, 2004,3 pages.

Mulder, Axel "Human Movement Tracking Technology", *Hand Centered Studies of Human Movement Project, Technical Report 94-1*, retrieved from <http://www.cs.sfu.ca/people/ResearchStaff/amulder/personal/vmi/HMTT.pub.html> on Aug. 10, 2004,(Jul. 1994),13 pages.

Zhai, Shumin "USER", *IBM Almaden Research*, retrieved from <http://www.almaden.ibm.com/u/zhai/> on Aug. 10, 2004,2 pages.

\* cited by examiner

DIRECT NAVIGATION OF TWO-DIMENSIONAL CONTROL USING A THREE-DIMENSIONAL POINTING DEVICE

CROSS-REFERENCE TO RELATED APPLICATIONS

This application is a Continuation of U.S. patent application Ser. No. 10/914,118, filed Aug. 10, 2004 and entitled Direct Navigation of Two-Dimensional Control Using a Three-Dimensional Pointing Device. The above application is incorporated herein by reference.

FIELD OF THE INVENTION

The present invention is directed to navigation of a two-dimensional displayed control, such as a cursor, using a three-dimensional pointing device.

BACKGROUND OF THE INVENTION

The mouse has long been the pointing device of choice for controlling a graphical user interface on a computing device. However, as displays become cheaper to manufacture, users are more apt to choose higher resolution displays. In fact, due to the low cost of displays, many users have begun to link two or more displays together to provide a larger total display area with a greater number of pixels. Unfortunately, users have also discovered that, as the total displayable area becomes larger, it becomes more difficult to control the on-screen cursor of a graphical user interface, especially with a conventional mouse.

Conventional mice provide a mapping between hand movement and cursor movement in a relative manner, often with respect to the surface across which the mouse moves. For example, when interacting with a large display having a high resolution, the conventional mouse would need to travel large distances to navigate from one end of the display to the other. Other pointing devices, such as electronic pens, have been used to provide absolute mapping between the position of the pointing device and the position of the cursor. However, because these devices typically interact directly with the display or some other writing surface, such devices become difficult to use as displays and writing surfaces increase in size.

There is therefore becoming a need to improve upon how a user may control the cursor, as well as other displayed controls, in a computing system.

SUMMARY OF THE INVENTION

Aspects of the present invention are directed to providing direct and absolute pointing with respect to a two-dimensional information display surface, much like how one would point a laser pointer or flashlight at a desired point. The term "absolute pointing" means that the cursor or other control moves to where the user is pointing a pointing device, independent of the prior position of the displayed control.

Further aspects of the present invention are directed to controlling the cursor or other displayed control by manipulating the pointing device in three dimensions, such as in-air. The translational position of the pointing device may be measured in three dimensions along first, second, and third degrees of freedom (e.g., X, Y, and Z axes). Also, the orientation of the pointing device may be measured along fourth, fifth, and optionally sixth degrees of freedom. A computing device may receive this information from the pointing device and determine where the pointing device is pointing to. If the pointing device is pointing at a display, then the computing device may cause the control to be displayed at the position to which the pointing device is pointing. In addition, the control may be displayed at an orientation that depends upon the orientation of the pointing device. Such a pointing device may be used only "in-air" or may include other types of pointing device functionality such as the functionality of a conventional electronic pen.

Further aspects of the present invention are directed to providing as a combined kit the pointing device and computer-executable instructions configured to allow a computing device to work with the pointing device.

These and other aspects of the invention will be apparent upon consideration of the following detailed description of illustrative embodiments.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

Figure 1:
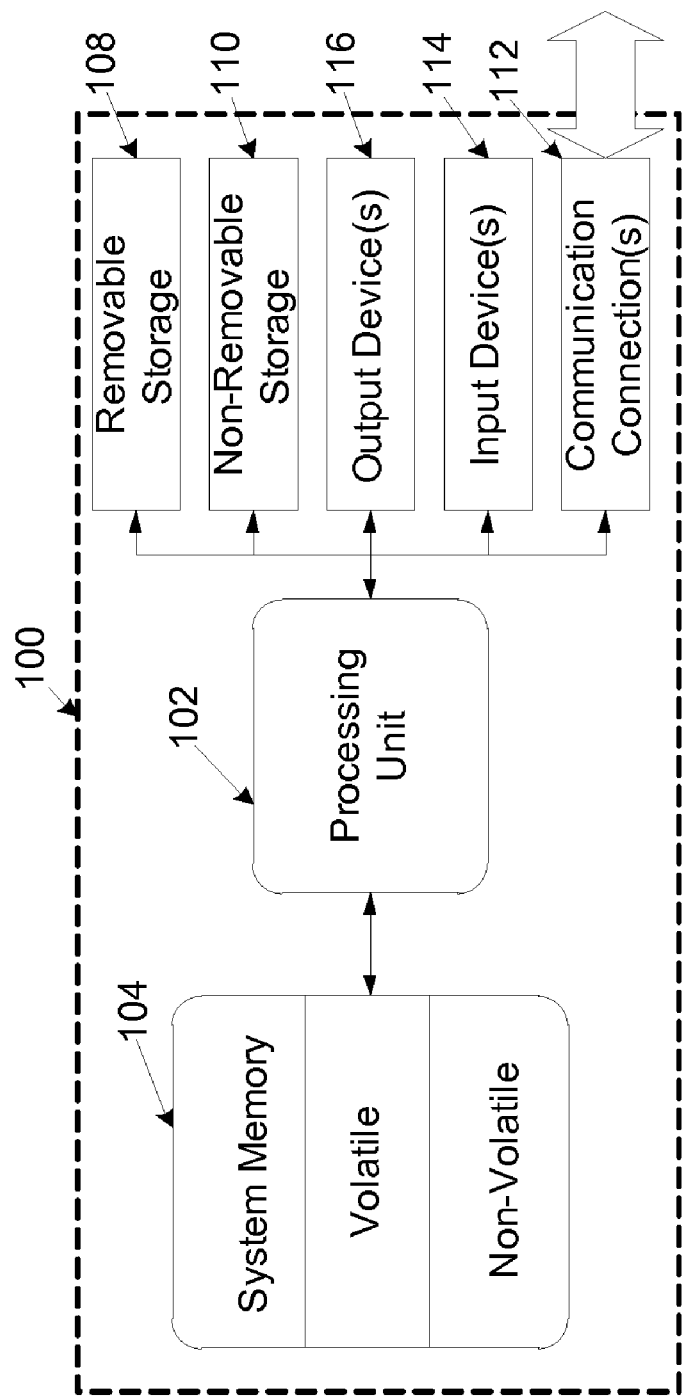
FIG. 1 is a functional block diagram of an illustrative computing device.

With reference to FIG. 1, an illustrative system for implementing aspects of the invention includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. Additionally, computing device 100 may have additional features/functionality, such as additional storage (removable and/or non-removable) including, but not limited to, magnetic or optical disks or tape. Such additional storage is illustrated in FIG. 1 by removable storage 108 and non-removable storage 110. A computer-readable storage medium includes one or more volatile and/or nonvolatile storage media, removable and/or non-removable storage media, implemented in any method or technology for storage of information such as computer-executable instructions (e.g., programs), data structures, and/or other data. Memory 104, removable storage 108, and non-removable storage 110 are all examples of computer-readable storage media. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, and/or any other medium that can be used to store the desired information and that can be accessed by device 100, either alone or in any combination or subcombination thereof. Any such computer-readable storage media may be part of, or configured to be compatible with, computing device 100.

Computing device 100 may further have one or more communication connections 112, which may be input and/or output connections. The communication connections 112 allow the computing device 100 to communicate with other devices outside of the computing device 100. The computing device 100 may further have or be coupled with one or more input devices 114 such as a keyboard, pointing device (e.g., a mouse, trackball, stylus, laser pointer, etc.), voice input device, touch input device, etc., as well as one or more output device(s) 116, such as a display, speakers, printer, etc.

The processing unit 102 may control one or more portions of the computing device 100. For example, the processing unit 102 may directly or indirectly control what is to be displayed on a display. The processing unit 102 may further execute computer-executable instructions and manipulate data provided to the processing unit 102. Computer-executable instructions and/or data may be provided to the processing unit 102 from the memory 104, the removable storage 108, the non-removable storage 110, the output devices 116, the input devices 114, and/or the communication connections 112.

Figure 2:
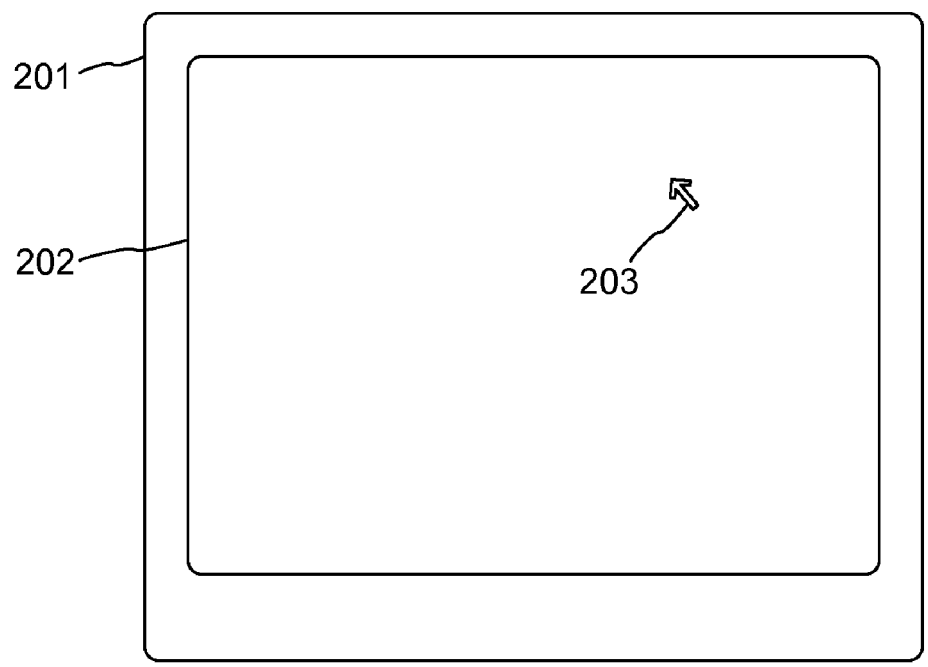
FIG. 2 is a plan view of an illustrative display device.

Referring to FIG. 2, an example of one of the output devices 116 coupled to or part of the computing device 100 may be a display 201. The display 201 may be any type of display, such as but not limited to a cathode ray tube (CRT) monitor, a liquid crystal display (LCD), a light-emitting diode (LED) display, an organic LED (OLED) display, a plasma display, a television set, or a projector. The display 201 may have a displayable portion 202 that may stretch across the entirety of the display 201 or may spread across only a portion of the display 201. The displayable portion 202, which may be flat or curved, is that portion of the display 201 that actually provides displayed output such as graphics and text. In the case of a projector, the displayable portion 202 would be the area of a projected surface onto which the projector is configured to project light. The display 201 may also present a displayed control 203, such as, but not limited to, a conventional mouse pointer, a window, or an icon.

Figure 3:
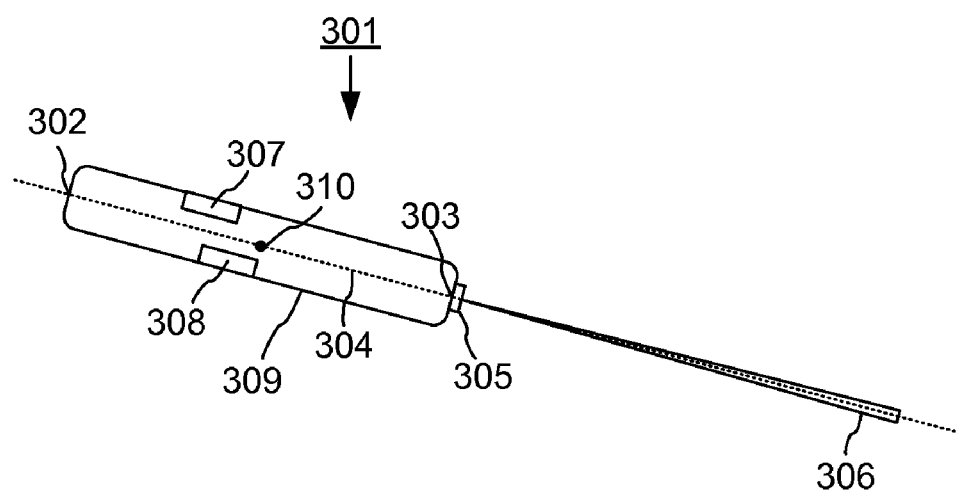
FIG. 3 is a side cutaway view of an illustrative pointing device.

Referring to FIG. 3, an example of one of the input devices 114 coupled to or part of the computing device 100 may be a pointing device 301. As will be discussed below, the translational position and/or orientation of the displayed control 203 may be manipulated using the pointing device 301. The illustrative pointing device 301 has a body 309, which may be a housing, frame, or other supporting structure. In this example, the body 309 is shown as elongated so as to be easily grasped and maneuvered by the human hand, such as a cylindrical shape. However, the body 309 may be of any shape and size. The pointing device 301 may define at least one imaginary linear axis 304. This axis 304 will be referred to herein as a "pointing axis." In this example, the pointing axis 304 is shown to extend between arbitrary imaginary points 302 and 303 on the body 309. The pointing axis 304 is fixed with respect to the pointing device 301 (and, in this case, the body 309). In other words, in this example, the pointing axis 304 moves with the pointing device 301 so as to always extend between the same two points 302, 303, regardless of the translational position or orientation of the pointing device 301.

The illustrative pointing device 301 further has a sensor 307 that senses the orientation and translational position of the pointing device 301. The sensor 307 may be a single sensor or may be made up of multiple sub-sensors. The sensor 307 may sense orientation in as many as two or three degrees of freedom (e.g., orientation about X, Y, and/or Z coordinate axes) and translational position in as many as three degrees of freedom (e.g., translational position along the X, Y, and/or Z coordinate axes). The sensor 307 may sense translational position and orientation using any one or more of a number of known technologies. For example, the sensor 307 may include a known magnetic tracker. The magnetic tracker may include an emitter and detector pair, where one of the emitter and the detector is attached to the pointing device 301 and the other of the emitter and the detector is located in the environment outside of the pointing device 301. Alternatively, the emitter may be replaced with the natural geomagnetic field of the Earth. An example of a device using magnetic position sensing technology is the Cyber Track product marketed by General Reality Company, and the SpacePad and Flock of Birds product marketed by Ascension Technology Corporation.

In addition to magnetic tracking, there are a myriad of known ways to track the translational position and/or orientation of an object. Other such technologies include, but are not limited to, optical tracking (e.g., using one or more cameras or laser interferometers), acoustic tracking (e.g., using ultrasound), mechanical tracking (e.g., using joint angle sensors), and inertial tracking (e.g., using a gyroscope). The sensor 307 may use only a single tracking technology or may use multiple types of tracking technologies. For example, a first type of tracking technology may be used to track the translational position of the pointing device 301, while a second type of tracking technology is used to track the orientation of the pointing device 301.

To communicate the sensed orientation and translational position to the computing device 100, the pointing device 301 further has a communication connection 308 coupled to the sensor 307. The communication connection 308 wirelessly (e.g., radio frequency or infra-red) or by wire communicates with the communications connection 112 of the computing device 100. Signals (e.g., analog signals and/or digital data) representing the orientation and the translational position of the pointing device 301 may be sent to the computing device 100 via the communication connection 308 periodically, sporadically, or continuously. The computing device 100 may then use these signals to control the translational position and/or orientation of the displayed control 203, such as a mouse pointer, on the display 201.

The illustrative pointing device 301 may further have a light source 305 that directs a relatively narrow, focused beam of light 306 in a single direction. For example, the beam of light 306 may be a substantially collimated beam, as is the light emitted from many known flashlights and laser pointers. The beam of light 306 is of a wavelength or wavelengths visible to the human eye, and may preferably be sufficiently narrow and directed so as to be useful for pointing by presenting a concentrated spot of light onto whatever surface the beam of light 306 is directed. The spot of light may be less than, e.g., a centimeter or two in diameter, or even less than a millimeter in diameter, and may be presented on surfaces that are distanced from the light source 305, such as by up to several feet, by up to several meters, or even more. The beam of light 306 may preferably be directed in a direction parallel to the pointing axis 304, and even coinciding with the axis 304, although neither of these is necessary. By coinciding the beam of light 306 with the pointing axis 304, the user is able to visually determine where the pointing axis 304 is directed at any given time. The light source 305 may be any type of light source, such as but not limited to a filamentous bulb, an LED, or a laser such as a laser diode. The light source 305 may further have an optical system, such as, but not limited to, one or more lenses, to direct the output light as a narrow beam. The light source 305 is not necessary for operation of the pointing device 301, and may be used merely to provide visual feedback to the user as to where the pointing device 301 is directed.

Figure 4:
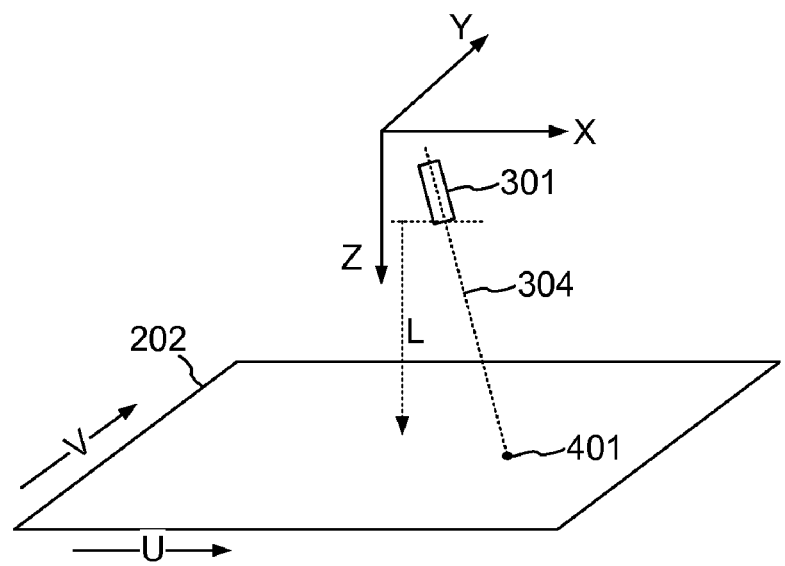
FIGS. 4 and 5 are perspective views of the pointing device and a displayable portion of the display.

Referring to FIG. 4, a user may mechanically manipulate the pointing device 301 within a volume of space by changing the orientation and/or the translational position of the pointing device 301. The term "orientation" as used herein refers to the rotational configuration of an object. The orientation of an object is measured with respect to a known imaginary point 310 associated with, and fixed relative to, the object as shown in FIG. 3. This imaginary point 310 is referred to herein as a "hub point." The hub point 310 may be the center of mass of the object or some arbitrary point in the object, on the object, or even outside the object. Pure rotation of the object does not result in translation (as defined below) of the hub point. Orientation may be measured in, e.g., angular degrees or radians, and may be defined with respect to one or more degrees of freedom around the hub point 310. In contrast, the terms "translate" or "translation" as used herein refer to any movement other than rotation. Translation does not exclude the possibility of rotation simultaneously with the translation, but rotation alone does not constitute a translation of an object. Unlike pure rotation, translation of the object causes the hub point 310 itself to translate. The term "translational position" as used herein refers to the location of an object irrespective of its orientation. The translational position of an object may be considered to be, for example, the translational position of the object's hub point 310.

As shown in FIG. 4, the pointing device 301 has been manipulated to a particular translational position and orientation, such that the pointing axis 304 is directed from the pointing device 301 toward a particular direction. In this case, the pointing axis 304 is directed toward the displayable portion 202 of the display 201, and intersects the displayable portion 202 at point 401. In this example, the light source 305 would direct the beam of light 306 to present a spot of light at point 401.

A three-dimensional coordinate system may be defined to measure the translational position and orientation of the pointing device 301. For example, as shown in FIG. 4, the pointing device 301 may be considered to be located somewhere in an X, Y, Z orthogonal axis coordinate system. However, other coordinate systems may be used, such as polar coordinate systems. In this example, it is assumed that the displayable portion 202 is substantially planar, that the X and Y axes are parallel to the displayable portion 202 and orthogonal to one another, and that the Z axis is orthogonal to the displayable portion 202. However, the X, Y, Z coordinate system may be oriented differently from that shown, and the displayable portion 202 may not necessarily be planar. Each of these translational position coordinates represents a different degree of freedom in which the pointing device 301 can move, for a total of three translational degrees of freedom. In the example coordinate system shown, the translational position of the pointing device 301 is uniquely and completely defined by a particular set of X, Y, Z coordinates. In particular, this set of coordinates may define the translational position of the hub point 301 or some other point associated with, and fixed relative to, the pointing device 301. The orientation of the pointing device 301 may similarly be defined using the X, Y, Z coordinate system, or by some additional coordinate system.

Also, in the example coordinate system shown, the orientation of the pointing device 301 may be defined by a set of angles relative to two of the three X, Y, Z, axes, i.e., either Ax and Ay, or Ax and Az, or Ay and Az. Other coordinate systems for defining the orientation of the pointing device 301 may be used. In this example, the angle of orientation of the pointing device 301 around a line parallel to the X axis (i.e., the angle of orientation in the Y-Z plane) will be denoted as Ax, and the angle of orientation of the pointing device 301 around a line parallel to the Y axis (i.e., the angle of orientation in the X-Z plane) will be denoted as Ay. Each of these orientations Ax, Ay represents a different degree of freedom in which the pointing device 301 can rotate, for a total of two rotational degrees of freedom.

In response to the translational position and orientation of the pointing device 301 being determined, the pointing device 301 may communicate this information to the computing device 100, which in turn may calculate the location of point 401 and command the display 201 to display the control 203 at the location of point 401. The control 203 may be any type of displayed element such as, but not limited to, a conventional mouse pointer, a window, or an icon.

Calculating the location of point 401, and thus of the displayed control 203, may include mapping the translational position and orientation of the pointing device 301 in the X, Y, Z coordinate system to a two-dimensional target coordinate system, in this example shown in FIG. 4 as coordinate system U, V. Thus, point 401 may have a particular set of U, V coordinates. In this example, the U and V axes together define a plane that coincides with the displayable portion 202. For simplifying this example, the X axis is parallel to the U axis and the Y axis is parallel to the V axis. The U, V Cartesian coordinate system is merely illustrative; any two-target coordinate system that defines a two-dimensional surface may be used. In general, mapping from one coordinate system to another is a well-known mathematical process that one of ordinary skill in the art could derive with little effort for a given pair of coordinate systems. The actual mapping algorithm would depend upon the pair of coordinate systems used.

Figure 5:
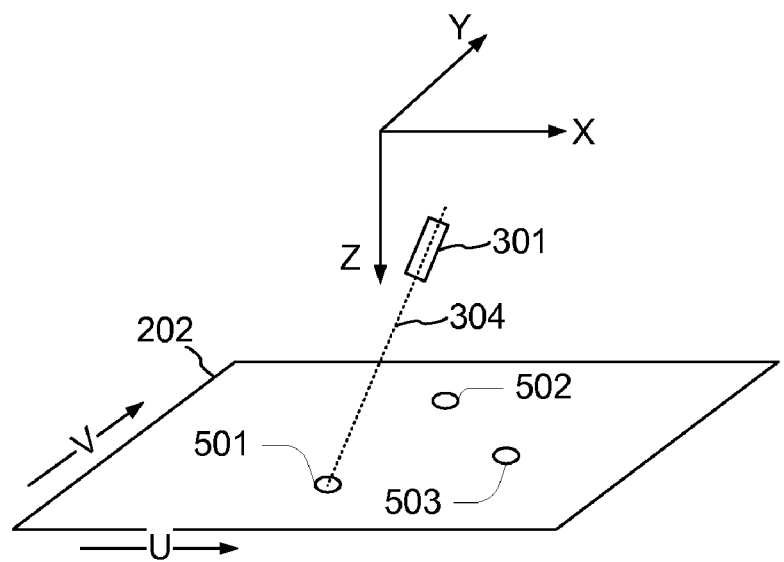

Referring to FIG. 5, it may be desirable to calibrate the sensor 307 of the pointing device 301 prior to use. Calibration allows the X, Y, Z coordinate system to be defined and located relative to the target U, V coordinate system. Calibration may involve pointing the pointing device 301 (i.e., directing the pointing axis 304) at a plurality of known reference positions, such as reference points. In this example, the computing device 100 commands the display 201 to display three reference points 501, 502, 503 on the on the U, V plane of the displayable portion 202. However, the reference points do not necessarily need to be displayed, and can be known reference positions located anywhere (e.g., marking stickers placed on the wall of the user's office). When presented by the display 201, these reference points may be sequentially displayed one at a time or displayed simultaneously.

To provide an example of how calibration can be performed, assume that three known reference points A, B, C are used for calibration. For purposes of simplifying this example, the orientation Ap around the pointing axis 304 will be ignored. Further assume that reference point A is positioned along the Z-axis, reference point B is positioned such that the pointing device 301 would point to it from reference point A merely by rotating the pointing device 301 in the X-Z plane, and reference point C is positioned such that the pointing device 301 would point to it from reference point A merely by rotating the pointing device 301 in the Y-Z plane. The given three reference points A, B, and C each has a given and known U, V set of coordinates denoted as (Ua, Va), (Ub, Vb) and (Uc, Vc), respectively. In this example, reference point A will be defined to be the origin for U-V system, i.e., Ua=Va=zero.

The coordinates of the pointing device 301 in X-Y-Z coordinate system during these three measurements will be denoted herein as (Xi, Yi, Zi, Axi, Ayi), where i=a, b, and c, representing points A, B, and C, respectively. When the pointing device 301 points to reference point A, a reference position is defined with the measured (Xa, Ya, Za, Axa, Aya), i.e., Xa=Ya=zero; Axa=Aya=zero. Za cannot yet be calibrated. In this way, all subsequent measurements are really relative to (Xa, Ya, Axa, Aya). However, for simplicity the mathematical delta symbol will not be used. When the pointing device 301 points to reference point B, the pointing device 301 is only rotating around Y-axis in our assumption, such that Axb=0, Yb=0. Thus, Vb=zero, and Ub=L tan(Ayb), where L is the Z-axis distance between the hub point 310 of the pointing device 301 and the U-V plane. At this point, the Z-coordinate can be determined. Assuming that when moving from pointing to reference point A to pointing to reference point B, the pointing device 301 would move in the X-Z plane by an amount given by Xb, Zb. In that case, Xb would be added to Ub=Xb+L tan(Ayb). The Z-axis position is recorded and calibrated as L, i.e., Zb=L. Subsequent Z coordinates would be the relative movement detected by the pointing device 301 and added to L. When the pointing device 301 moves to point to reference point C, the pointing device 301 need only rotate about the X-axis compared with when the pointing device was pointing to reference point A. Thus, Ayc=Xc=zero, Uc=zero, and Vc=Yc+(Zc+L) tan(Axc), assuming that Zc is the relative Z-axis displacement of the hub point 310 compared with when reference point B was measured.

Based on the above procedure, we have now initialized the reference points of X, Y, Z, Ax, Ay. After calibration is complete, subsequent translational positions and orientations of the pointing device 301 may be mapped to the target coordinate system. For an arbitrary motion of the pointing device 301 the target U, V coordinates for the displayed control 203 may be calculated as follows:

$$U=X+(Z+L)\tan(Ay), \text{ and}$$

$$V=Y+(Z+L)\tan(Ax).$$

In addition to the three translational degrees of freedom and two rotational degrees of freedom discussed above, the pointing device 301 may have an additional rotational degree of freedom, which would be orientation of the pointing device 301 around the pointing axis 304. The angle of orientation of the pointing device 301 around the pointing axis 304 (i.e., the angle of orientation in the plane that is normal to the pointing axis 304) will be denoted herein as Ap. Note that the U, V coordinates of the displayed control 203 would not be affected by Ap. Instead, the orientation of the displayed control 203 may be based on Ap. Thus, for example, from the point of view of looking from behind the pointing device toward the displayable portion 202, a rotation of the pointing device 301 clockwise around the pointing axis 304 may result in a clockwise rotation of the displayed control 203. Likewise, a counter-clockwise rotation of the pointing device 301 around the pointing axis 304 may result in a counter-clockwise rotation of the displayed control 203. Also, the amount of rotation of the displayed control 203 may preferably be equal to (or the negative of, depending upon the U-V coordinate system) Ap. Although the previous examples assume that the rotational degrees of freedom are measured as Ax, Ay, and Ap, other rotational coordinate systems may be used. For example, the rotational degrees of freedom may be measured as Ax, Ay, and Az, where Az is the angle of orientation of the pointing device 301 around a line parallel to the Z axis (i.e., the angle of orientation in the Y-Z plane). In this latter coordinate system, the orientation of the displayed control 203 in the U-V plane may depend upon a combination of Ax, Ay, and Az.

It should be noted that the pointing device 301 may further be combined with other types of pointing device elements such as a trackball, a scroll wheel, or a traditional electronic pen sensor. For example, the pointing device 301 may be configured to sense not only its translational position and orientation as discussed above, but also to sense whether or not the pointing device 301 is in contact with a writing surface such as the display 201 and/or the position of the pointing device 301 with respect to the writing surface.

Figure 6:
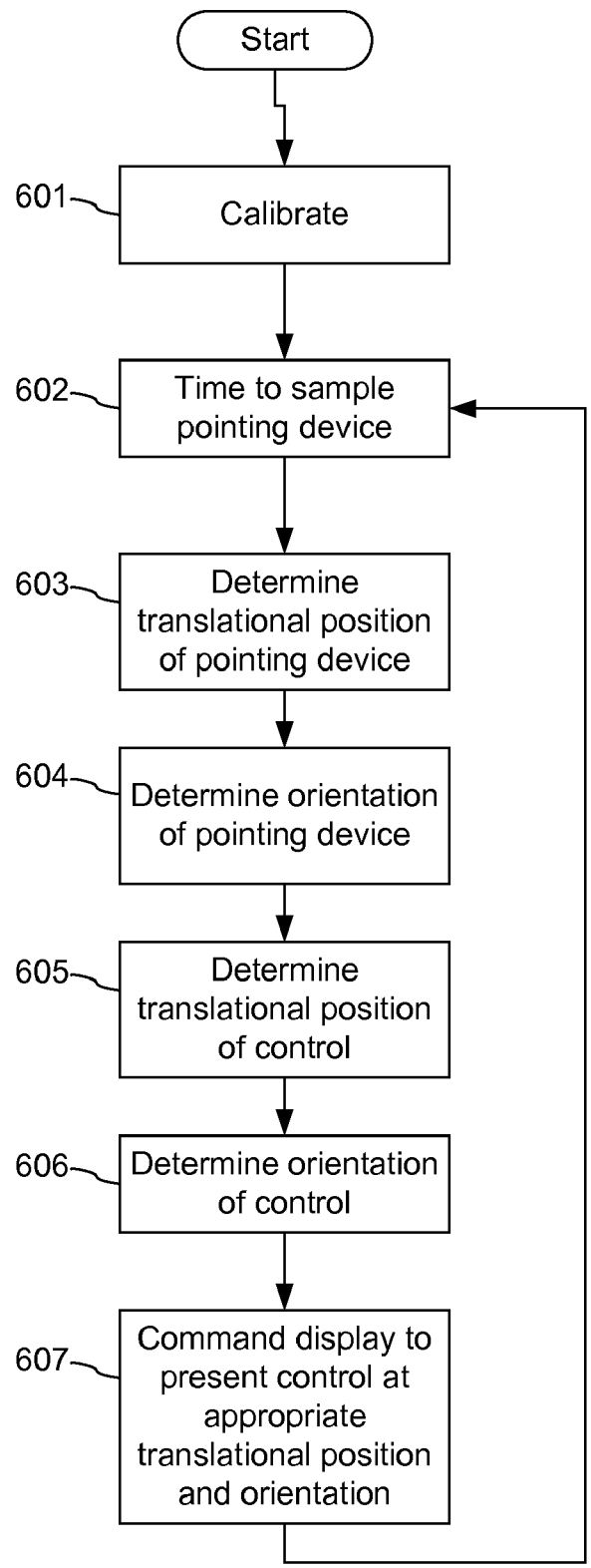
FIG. 6 is a flowchart showing illustrative steps that may be taken in calibrating and using the pointing device.

Referring to FIG. 6, an illustrative flowchart summarized how the pointing device 301 and computing device 100 may be used together as a system. In step 601, the pointing device 301 is calibrated, such as in the manner described above. Once the pointing device 301 is calibrated, samples may be taken of the translational position and orientation of the pointing device 301. Such samples may be taken continuously, sporadically, or periodically. When it is time to take a sample (step 602), the translational position and orientation of the pointing device 301 may be determined in steps 603 and 604. Next this information is sent to the computing device 100, and the computing device 100 determines the appropriate translational position, and optionally the orientation, of the displayed control 203 in steps 605 and 606. This may be done by mapping from the X, Y, Z system to the U, V system as previously described. Next, in step 607, the computing device 100 commands the display 201 to display the control 203 at the determined translational position, and optionally at the determined orientation. Steps 602-607 may be repeated for each subsequent sampling.

Figure 7:
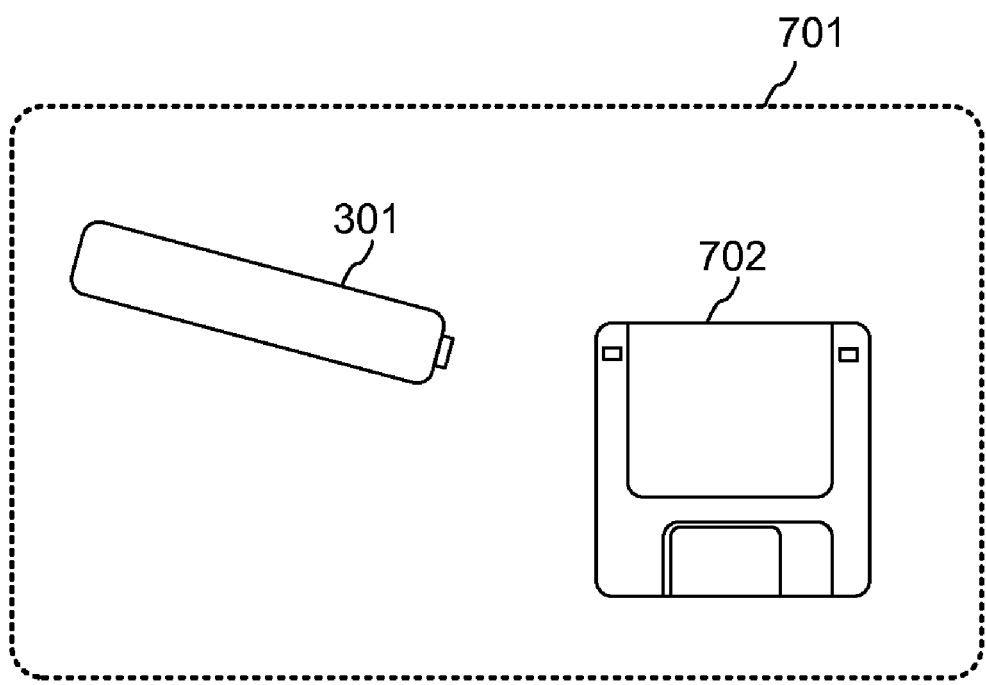
FIG. 7 is a plan view of the pointing device and an illustrative computer-readable medium that may be marketed together as a kit.

Referring to FIG. 7, the pointing device 301 may be marketed in combination with a computer-readable medium such as a removable diskette 702. The diskette 702 may include computer-readable instructions, such as software, that configures the computing device 100 to perform some or all of the functions described above. For example, the computer-readable instructions may configure the computing device 100 to receive values of the translational position and orientation of the pointing device, to determine the appropriate translational position and, optionally, orientation of the displayed control 203 associated with the received values, and to command the display 201 to actually display the control 203.

While illustrative systems and methods as described herein embodying various aspects of the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Also, the invention has been defined using the appended claims, however these claims are exemplary in that the invention is intended to include the elements and steps described herein in any combination or sub-combination. It will also be appreciated and understood that modifications may be made without departing from the true spirit and scope of the invention.

What is claimed is:

1. In a computing device, a method comprising:
    calibrating a device using a coordinate system and known reference locations to enable the device to control a visual indicium based on one or more of a translational position or an orientation of the device, the calibrating comprising:
  defining as zero with respect to the coordinate system, a first X position, a first Y position, a first orientation about an X axis, and a first orientation about a Y axis, responsive to the device being directed to a first reference location of the known reference locations;
  defining as zero with respect to the coordinate system and responsive to the device being directed to a second reference location of the known reference locations, one of:
    a second X position and a second orientation about the Y axis; or
    a second Y position and a second orientation about the X axis; and
  calculating a distance from the device to a plane in which the first reference location and the second reference location exist;
  defining as zero with respect to the coordinate system and responsive to the device being directed to a third reference location of the known reference locations, the other of:
    the second X position and the second orientation about the Y axis; or
    the second Y position and the second orientation about the X axis; and
  controlling the visual indicium on a display based on movement of the device and relative to the coordinate system.

2. The method of claim 1, wherein controlling the visual indicium comprises:
  determining the translational position of the device based with reference to a first degree of freedom, a second degree of freedom, and a third degree of freedom;
  determining the orientation of the device with reference to a fourth degree of freedom, a fifth degree of freedom, and a sixth degree of freedom; and
  determining an orientation of the visual indicium based on the orientation of the device along the sixth degree of freedom.

3. The method of claim 2, wherein the device has a body, a linear axis being defined that is fixed with respect to the body, and wherein controlling the visual indicium comprises determining a translational position for the visual indicium by determining a projected location on the display to which the linear axis projects and defining the translational position of the visual indicium to be the projected location.

4. The method of claim 1, further comprising calibrating the device along the first, second, third, fourth, and fifth degrees of freedom and using the known reference locations.

5. The method of claim 4, further comprising controlling the display to display an element at each of the known reference locations.

6. The method of claim 4, wherein the known reference locations are locations apart from the display.

7. The method of claim 1, wherein the visual indicium comprises a mouse pointer.

8. The method of claim 1, wherein the display includes a plurality of display screens.

9. A computer-readable memory device storing computer-executable instructions for performing the steps recited in claim 1.

10. A computer-implemented method comprising:
  calibrating a device using a coordinate system and known reference locations by:
    defining as zero with respect to the coordinate system, a first X position, a first Y position, a first orientation about an X axis, and a first orientation about a Y axis, responsive to the device being directed to a first reference location of the known reference locations;
    defining as zero with respect to the coordinate system and responsive to the device being directed to a second reference location of the known reference locations, one of:
      a second X position and a second orientation about the Y axis; or
      a second Y position and a second orientation about the X axis; and
    calculating a distance from the device to a plane in which the first reference location and the second reference location exist;
    defining as zero with respect to the coordinate system and responsive to the device being directed to a third reference location of the known reference locations, the other of:
      the second X position and the second orientation about the Y axis; or
      the second Y position and the second orientation about the X axis; and
  receiving data representing a translational position and an orientation of the device along at least five degrees of freedom relative to the coordinate system; and
  determining a position for a visual indicium based on the translational position and the orientation of the device along the at least five degrees of freedom.

11. The method of claim 10, further comprising
determining an orientation for the visual indicium based on an orientation of the device along a sixth degree of freedom.

12. The method of claim 10, wherein the pointing device includes a linear axis fixed with respect to the device, the method further comprising determining a translational position of the visual indicium by determining a projected location of the axis outside of the device, the translational position of the visual indicium being based on the projected location.

13. A computer-readable memory device storing computer-executable instructions for performing the steps recited in claim 10.

14. A computer-implemented method comprising:
  calibrating a device using a coordinate system and known reference locations by:
    defining a first position for the device in the coordinate system responsive to the device being directed to a first reference location of the known reference locations, the first position for the device being defined as zero for a first X coordinate, a first Y coordinate, a first orientation about an X axis, and a first orientation about a Y axis;
    defining a second position for the device in the coordinate system responsive to the device being directed to a second reference location of the known reference locations, the second position for the device being defined as zero for one of:
      a second X coordinate and a second orientation about the Y axis; or
      a second Y coordinate and a second orientation about the X axis; and
    calculating a distance from the device to a plane in which the first reference location and the second reference location exist;
    defining a third position for the device in the coordinate system responsive to the device being directed to a third reference location of the known reference locations, the third position for the device being defined as zero for the other of:
  the second X coordinate and the second orientation about the Y axis; or
  the second Y coordinate and the second orientation about the X axis; and
determining a translational position of the device relative to the coordinate system based on the first position and the second position;
determining an orientation of the device relative to the coordinate system based on the first position and the second position; and
controlling a visual indicium based on the translational position and the orientation of the device.

15. A system comprising:
one or more computer-readable memory devices storing computer-executable instructions configured to be executed by a computer to cause the computer to perform a method, comprising:
  calibrating a device using a coordinate system and known reference locations to enable the device to control a visual indicium based on one or more of a translational position or an orientation of the device, the calibrating comprising:
    defining as zero with respect to the coordinate system, a first X position, a first Y position, a first orientation about an X axis, and a first orientation about a Y axis, responsive to the device being directed to a first reference location of the known reference locations;
    defining as zero with respect to the coordinate system and responsive to the device being directed to a second reference location of the known reference locations, one of:
      a second X position and a second orientation about the Y axis; or
      a second Y position and a second orientation about the X axis;
    calculating a distance from the device to a plane in which the first reference location and the second reference location exist; and
    defining as zero with respect to the coordinate system and responsive to the device being directed to a third reference location of the known reference locations, the other of:
      the second X position and the second orientation about the Y axis; or
      the second Y position and the second orientation about the X axis; and
  receiving a signal from the device that includes data representing a translational position and an orientation of the device relative to the coordinate system; and
  determining a position of a visual indicium based on the translational position and the orientation of the device.

16. The system of claim 15, further comprising the device, wherein the device includes a body and a sensor that is physically coupled to the body, and wherein receiving the signal from the device comprises receiving the signal from the sensor.

17. The system of claim 16, wherein the body has a first end and a second that define a linear axis passing through the first end and the second end, the method further comprising determining a translational position of the visual indicium by determining a projected location of the axis outside of the body and determining the translational position of the visual indicium based on the projected location.

18. The system of claim 17, wherein the device further includes a light source physically coupled to the body, the light source being configured to emit a focused beam of light directed along the axis.

19. The system of claim 18, wherein the light source comprises a laser source.

20. The system of claim 16, wherein the method further comprises:
  receiving data representing an orientation of the body along a sixth degree of freedom; and
  determining an orientation of the visual indicium based the orientation of the body along the sixth degree of freedom.

21. The system of claim 16, wherein the sensor is configured to magnetically sense at least one of the translational position or the orientation of the body.

22. The system of claim 15, wherein the method further comprises sending a second signal that includes information indicating a translational position of the visual indicium.

* * * * *